United States Patent Office 3,639,506
Patented Feb. 1, 1972

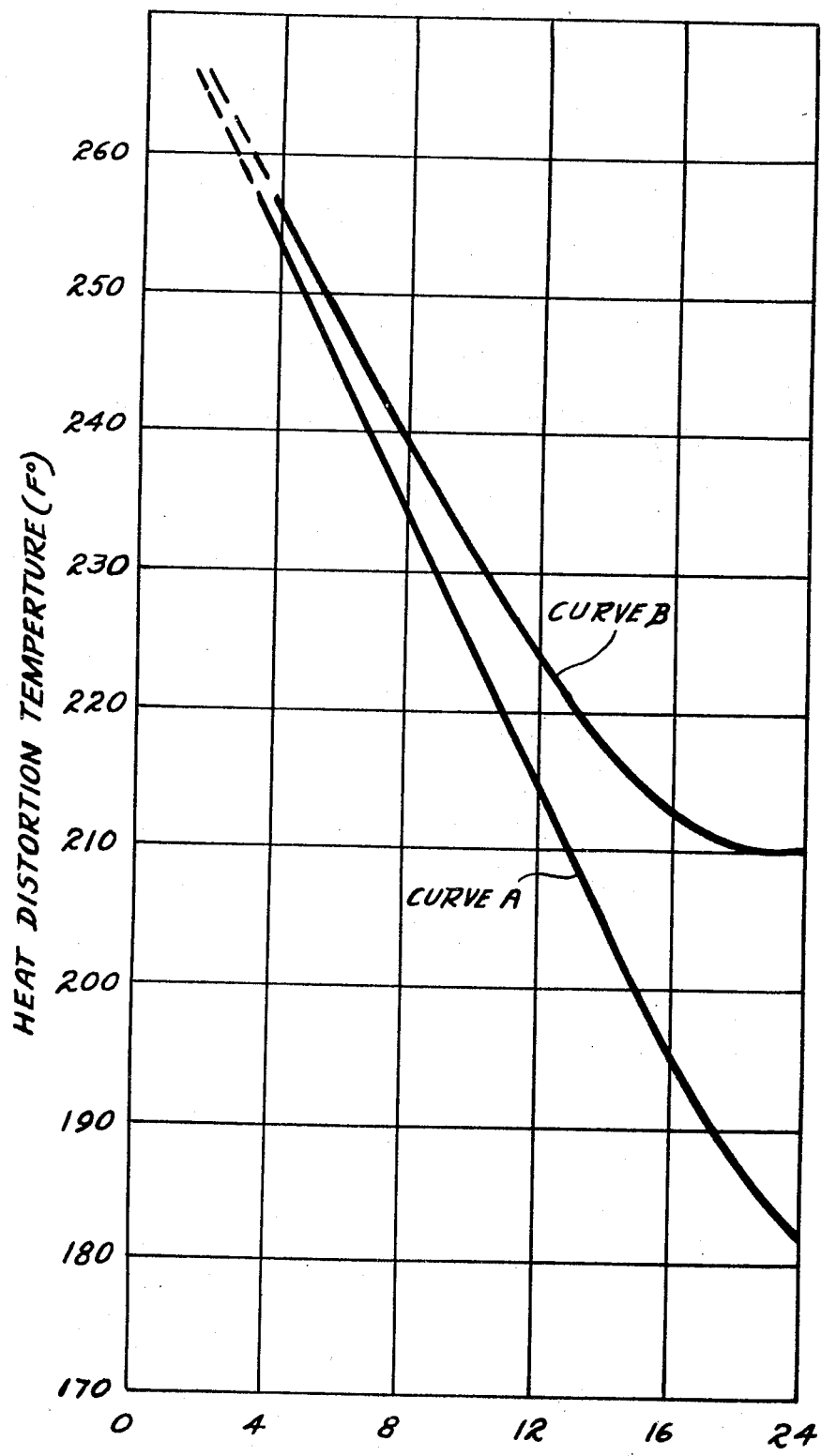

3,639,506
FLAME RETARDANT COMPOSITION OF POLY-
PHENYLENE ETHER, STYRENE RESIN, ARO-
MATIC PHOSPHATE AND AROMATIC HALOGEN
COMPOUND
William R. Haaf, Voorhesville, N.Y., assignor to
General Electric Company
Filed May 21, 1969, Ser. No. 826,579
Int. Cl. C08g 43/02
U.S. Cl. 260—874
19 Claims

ABSTRACT OF THE DISCLOSURE

This invention is for a blend of a polyphenylene ether and a styrene resin characterized by the addition of a flame retardant combination comprising an aromatic phosphate and an aromatic halogen compound. The polyphenylene ethers are known to have excellent flame retardant properties while the styrene resins are known to have poor flame retardant properties. The admixture of a polyphenylene ether with a styrene resin destroys the flame retardancy of the polyphenylene ethers. In accordance with the present invention, it has been found that the addition of a combination of an aromatic phosphate and an aromatic halogen compound in small amounts to a blend of a polyphenylene ether and a styrene resin improves the flame retardant properties of the blend to a point where it satisfies the requirements set forth by the Underwriters' Laboratory.

BACKGROUND OF THE INVENTION (1) Field of the invention

This invention relates to mixed synthetic resins, and more particularly, to a mixture of a polyphenylene ether and a styrene containing resin characterized by the addition of a flame retardant combination comprising an aromatic phosphate and an aromatic halogen compound.

(2) Description of the prior art

Blends of a polyphenylene ether and a styrene resin are known in the art and described in U.S. Pat. No. 3,383,-435 of Eric P. Cizek, incorporated herein by reference. The polyphenylene ether portion of the blend is one having the repeating structural units conforming to the formula:

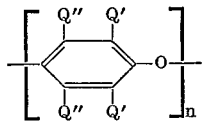

wherein the oxygen ether atom of one unit is connected to the benzene nucleus of the next adjoining unit; $n$ is a positive integer equal to at least 100; and each of $Q'$ and $Q''$ is a monovalent substitutent selected from the group consisting of hydrogen, halogen, hydrocarbon radicals free of a tertiary-alpha-carbon atom, halohydrocarbon radicals having at least two carbon atoms between the halogen atom and phenol nucleus and being free of a tertiary-alpha-carbon atom, hydrocarbonoxy radicals being free of a tertiary-alpha-carbon atom, and halohydrocarbonoxy radicals having at least two carbon atoms between the halogen atom and phenyl nucleus and being free of tertiary-alpha-carbon atom. Examples of a polyphenylene ethers conforming to the formula and methods for their formation may be found in U.S. Pats. Nos. 3,306,874 and 3,306,875 of Allan S. Hay and U.S. Pats. Nos. 3,257,357 and 3,257,358 of Gelu Stoeff Stamatoff.

The styrene resin portion of the blends described in the above noted Cizek patent has at least 25 percent by weight polymer units derived from the compound having the formula:

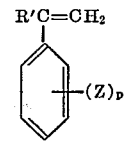

where $R'$ is a hydrogen, lower alkyl or halogen; Z is a member selected from the class consisting of vinyl, halogen, and lower alkyl; and $p$ is a whole number equal to from 0 to the number of replaceable hydrogen atoms on the benzene nucleus. Typical styrene resins include, by way of example, homopolymers such as polystyrene and polychlorostyrene, the modified polystyrenes such as rubber modified polystyrenes (high impact styrenes), and the styrene containing copolymers such as the styrene-acrylonitrile copolymers (SAN), styrene-butadiene copolymers, styrene-acrylonitrile-alpha-alkyl styrene copolymers, styrene-acrylonitrile-butadiene copolymers (ABS), poly-alpha-methyl styrene, copolymers of ethylvinyl benzene and divinyl benzene, and the like.

It is known in the art that the polyphenylene ethers have excellent flame retardant properties and are classified self-extinguishing and non-dripping according to ASTM test method D 635 and Underwriters' Laboratories Bulletin No. 94. On the other hand, most styrene resins are not self-extinguishing and non-dripping; but rather burn at a slow rate upon ignition. Consequently, due to the poor flame retardant properties of the styrene resins, many blends comprising a styrene resin, even in low concentration, with a polyphenylene ether have poor flame retardant properties and are unable to meet the requirements established by various testing laboratories such as the Underwriters' Laboratories. This restricts the use of the blends for many commercial applications. For example, recent emphasis on safety in autos and trucks by the General Services Administration and other federal and state regulatory agencies indicates that most or all of the plastics used in vehicles will have a requirement for flame retardancy. Further, the construction field looms large as a potential plastics market, and the question of flammability has become a matter of growing concern to the fabricator, end user, and various private and governmental agencies requiring higher safety standards.

It is known in the art that plastics may be rendered flame retardant by the addition of various chemicals to the plastic known as "flame retardants." Flame retardants can be divided into types: (1) additives which are blended physically with the material and (2) modifiers which are reactive and unite chemically with the plastic. The former include most organic phosphate esters, halogenated hydrocarbons such as chlorinated waxes, antimony oxide, and inorganic salts. The latter group (2) includes chlorendic acid and its derivatives, halogenated phthalic anhydride, phosphorus and halogen-containing polyols, and halogenated phenols. It should be noted, however, that improving flame retardancy is not simply a matter of adding chemicals. Combining flame retardant additives with various polymers not only affects burning characteristics, it frequently changes the color, flexibility, tensile strength, electrical properties, softening point, and moldability characteristics of the plastic. Obtaining adequate flame retardant properties usually requires loading the plastic with a high concentration of flame retardant.

Prior art flame retardants, such as those noted above, have been added to blends of the polyphenylene ethers and styrene resins with some of even substantial improvement in flame retardant properties. For example, aromatic phosphates such as triphenyl phosphates have been added to the blends of the polyphenylene ethers and styrene resins with flame retardant properties being improved to the point where the blends may be classified as self-extinguishing and non-dripping according to the above-noted ASTM test method D 635 and Underwriters' Laboratory Bulletin No. 94. However, triphenyl phosphate is a plasticizer for the blend and its addition even in the small amounts necessary for flame retardancy, results in a substantial decrease in heat distortion temperature of the blend to a point where the commercial use of the blend is substantially impaired. Other aromatic phosphates behave in similar manner. Aromatic halogen compounds also have been added to the blends, but their addition in commercially feasible quantities generally does not result in satisfactory flame detardant properties.

STATEMENT OF THE INVENTION

The present invention is predicated upon the discovery that the addition of a small but effective quantity of a flame retardant combination of an aromatic phosphate and an aromatic halogen compound to a blend of a polyphenylene ether and a styrene resin substantially improves flame retardant properties without depressing heat distortion temperature of the polymer to a point where its commercial use is substantially impaired. In addition, the substitution of an aromatic halogen compound for a portion of an aromatic phosphate results in a substantial costs savings. A preferred composition in accordance with the invention comprises from 20 to 80% by weight poly(2,6-dimethyl-1,4-phenylene) ether, 20 to 80% by weight of a high impact polystyrene (styrene modified with rubber) and from 3 to 25 parts by weight per 100 parts by weight polymer of a flame retardant combination of 1 part triphenyl phosphate and 3 to 4 parts of a heavily-chlorinated biphenyl.

DESCRIPTION OF THE PREFERRED EMBODIMENTS

The flame retardant polymers of the present invention are the blends of the above-noted patent of Eric P. Cizek characterized by the addition of a flame retardant combination comprising an aromatic phosphate and an aromatic halogen compound. The aromatic phosphate component of the combination would include, but not be limited to those triesters of the type:

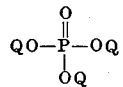

where each Q represents the same or different radicals including hydrocarbon radicals such as alkyl, cycloalkyl, aryl, alkyl substituted aryl and aryl substituted alkyl; halogen; hydrogen and combinations thereof provided that at least one of said R's is aryl. Typical examples of suitable phosphates include, phenylbisdodecyl phosphate, phenylbisneopentyl phosphate, phenylethylene hydrogen phosphate, phenyl-bis(3,5,5' - trimethylhexyl phosphate), ethyldiphenyl phosphate, 2-ethyl-hexyl-di(p-tolyl) posphate, di-phenyl hydrogen phospate, bis (2-ethylhexyl) p-tolylphosphate, tritolyl phosphate, bis (2-ethylhexyl)phenyl phosphate, tri(nonylphenyl)phosphate, phenylmethyl hydrogen phosphate, di(dodecyl) p-tolyl posphate, tricresyl phosphate, triphenyl phosphate, dibutylphenyl phosphate, 2 - chloroethyldiphenyl phosphate, p-tolyl bis(2,5,5 - trimethylhexyl)phosphate, 2-ethylhexyldiphenyl phosphate, diphenyl hydrogen phosphate, etc. The preferred phosphates are those where each R is aryl. The most preferred phosphate is triphenyl phosphate.

The aromatic halogen component of the flame retardant combination preferably conforms to the formula:

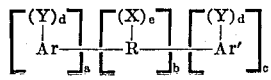

wherein R is an alkylene, alkylidene or cycloaliphatic linkage, e.g., methylene, ethylene, propylene, isopropylene, isopropylidene, butylene, isobutylene, amylene, cyclohexylene, cyclopentylidene, etc.; a linkage selected from the group consisting of ether; carbonyl; amine; a sulfur containing linkage, e.g., sulfide, sulfoxide, sulfone; a phosphorus containing linkage; etc. R can also consist of two or more alkylene or alkylidene linkages connected by such groups as aromatic, amino, ether, carbonyl, sulfide, sulfoxide, sulfone, a phosphorus containing linkage, etc. Other groups which are represented by R will occur to those skilled in the art.

Ar and Ar' are mono- or polycarbocyclic aromatic groups such as phenylene, biphenylene, terphenylene, naphthylene, etc. Ar and Ar' may be the same or different.

Y is a substituent selected from the group consisting of organic, inorganic or organometallic radicals. The substituents represented by Y include (1) halogen, e.g., chlorine, bromine, iodine fluorine or (2) ether groups of the general Formula OE, wherein E is a monovalent hydrocarbon radical similar to X or (3) monovalent hydrocarbon groups of the type represented by R or (4) other substituents, e.g., nitro, cyano, etc., said substituents being essentially inert provided there be at least one and preferably two halogen atoms per aryl nucleus.

X is a monovalent hydrocarbon group exemplified by the following: alkyl, such as methyl, ethyl, propyl, isopropyl, butyl, decyl, etc.; aryl groups, such as phenyl, naphthyl, biphenyl, xylyl, tolyl, etc.; aralkyl groups such as benzyl, ethylphenyl, etc.; cycloaliphatic groups, such as cyclopentyl, cyclohexyl, etc.; as well as monovalent hydrocarbon groups containing inert substituents therein. It will be understood that where more than one X is used they may be alike or different.

The letter $d$ represents a whole number ranging from 1 to a maximum equivalent to the number of replaceable hydrogens substituted on the aromatic rings comprising Ar or Ar'. The letter $e$ represents a whole number ranging from 0 to a maximum controlled by the number of replaceable hydrogens on R. The letters $a$, $b$, and $c$ represent whole numbers including 0. When $b$ is not 0, neither $a$ nor $c$ may be 0. Otherwise either $a$ or $c$, but not both, may be 0. Where $b$ is 0, the aromatic groups are joined by a direct carbon-carbon bond.

The hydroxyl and Y substituents on the aromatic groups, Ar and Ar' can be varied in the ortho, meta or para positions on the aromatic rings and the groups can be in any possible geometric relationship with respect to one another.

Included within the scope of the above formula are biphenols of which the following are representative:

2,2-bis-(3,5-dichlorophenyl)-propane
bis-(2-chlorophenyl)-methane
bis-(2,6-dibromophenyl)-methane
1,1-bis-(4-iodophenyl)-ethane
1,2-bis-(2,6-dichlorophenyl)-ethane
1,1-bis-(2-chloro-4-iodophenyl)-ethane
1,1-bis-(2-chloro-4-methylphenyl)-ethane
1,1-bis-(3,5-dichlorophenyl)-ethane
2,2-bis-(3-phenyl-4,4-bromophenyl)-ethane
2,6-bis-(4,6-dichloronaphthyl)-propane
2,2-bis-(2,6-dichlorophenyl)-pentane
2,2-bis-(3,5-dichlorophenyl)-hexane
bis-(4-chlorophenyl)-phenyl-methane
bis-(3,5-dichlorophenyl)-cyclohexylmethane
bis-(3-nitro-4-bromophenyl)-methane
bis-(4-hydroxy-2,6-dichloro-3-methoxyphenyl)-methane
2,2-bis-(3,5-dichloro-4-hydroxyphenyl)-propane
2,2-bis-(3-bromo-4-hydroxyphenyl)-propane The preparation of these and other applicable bisphenols is known in the art. They are most commonly prepared by condensation of two moles of a phenol with a single mole of a ketone or aldehyde. In place of the divalent aliphatic group in the above examples may be substituted sulfide, sulfoxy, etc.

Included within the above structural formula are substituted benzenes exemplified by 1,3-dichlorobenzene, 1,4-dibromobenzene, 1,3-dichloro-4-hydroxybenzene and biphenyl such as 2,2′ - dichlorobiphenyl, 2,4′ - dibromobiphenyl, and 2,4′-dichlorobiphenyl.

The manner of adding the flame retardant combination to the polymer blend is not critical and does not constitute part of this invention. Preferably, each component is added as a part of the blend premix, the latter being passed through an extruder with extrusion temperature being maintained between about 450° and 640° F., dependent upon the composition of the blend. The strands emerging from the extruder may be cooled, chopped into pellets, re-extruded, chopped into pellets and molded to a desired shape.

The concentration of the flame retardant combination in the blend is not critical and is dependent to a large extent upon the concentration of the styrene resin and the particular styrene resin used. Lower concentrations of styrene resin or less flammable styrene resins require a lower concentration of the flame retardant. In general, a small concentration of the flame retardant combination is desirable, 3 to 25 parts per 100 parts of polymer (phr.) generally being acceptable and between 6.0 and 10.0 phr. being preferred where the styrene content of the blend permits. The concentration of the phosphate relative to the concentration of the aromatic halogen compound may be as low as 1:5, ratios of 1:3 to 1:4 aromatic phosphate to aromatic halogen being preferred.

The following examples will more fully illustrate the invention. In each example, flame retardant properties are determined following procedures established by the Underwriters' Laboratory Bulletin No. 94. Following this procedure, a test bar measuring 2½″ x ½″ x ⅛″ thick is twice ignited. After each (10 second) ignition, the test bar must extinguish itself within 30 seconds and the bar may not drip during the burning. For example, ten bars are tested and the average of the ten self-extinguishing times obtained after either the first or second ignition may not exceed 25 seconds. If any one bar of the ten burns for a period exceeding 30 seconds after either first or second ignition, the test is considered unsuccessful.

EXAMPLE 1

A blend comprising 55 parts by weight of a poly-(2,6-dimethyl-1,4-phenylene) ether and 45 parts by weight of a high impact polystyrene was prepared in a Waring Blendor. The blended mixture was extruded using a 1″ laboratory extruder to produce about two pounds of pellets. The extruded pellets were molded into test bars by means of a molding machine. The test bars measured 2½″ x ½″ x ⅛″ and were used to determine the flammability behavior of the blend. It was found that the bars burned completely and dripped after ignition thereof.

EXAMPLE 2

The procedure of Example 1 was repeated with the addition of triphenyl phosphate to the blend of polymers in an amount of 20 parts by weight phosphate per 100 parts resin (phr.). For this formulation, extinguishing time after first ignition was one second for an average of 5 bars and after second ignition, 2 seconds for an average of 5 test bars.

EXAMPLE 3

The procedure of Example 1 was repeated with the addition of 10 phr. triphenyl phosphate and 10 phr. "Aroclor 1268," a heavily chlorinated biphenyl to the polymer blend. An average of five test bars had a self-extinguishing time of about one second after first ignition and about 2 seconds after second ignition.

In addition to flammability behavior for the test bars of Examples 2 and 3, heat distortion temperature and Izod notched impact strength were determined. Also, 2½″ L-type tensile bars were formed from the blends of Examples 2 and 3 and used to determine tensile properties. The results of the various tests are set forth in the following table:

| Property | Example 2 | Example 3 |
|---|---|---|
| Self-extinguishing time [1]: | | |
| After 1st ignition | 1 | 1 |
| After 2nd ignition | 2 | 2 |
| Heat deflection temp. (264 p.s.i.-° F.) | 181 | 210 |
| Impact strength (ft./lbs./inch notch) | 2.36 | 1.14 |
| Yield strength (p.s.i.) | 10,780 | 12,080 |
| Ultimate strength (p.s.i.) | 8,450 | 10,480 |
| Elongation (percent) | 30.3 | 18.0 |

[1] Average of 5 samples, no one bar burning over 25 seconds.

A comparison of Examples 2 and 3 shows substantially similar properties for the blends with the exception of heat distortion temperature where the blend of Example 2 has a substantially lower heat distortion temperature than that of Example 3. This difference is attributed to the plasticizing effect of the triphenyl phosphate.

EXAMPLE 4

The procedure of Examples 2 and 3 was repeated, but samples were prepared containing concentrations of flame retardants varying from 0 to 20 phr. A first series of samples was prepared containing only triphenyl phosphate. A second series of samples was prepared containing the flame retardant combination of the triphenyl phosphate and the Aroclor 1268. In the second series of samples, the ratio of the triphenyl phosphate to the Aroclor 1268 was maintained at 1:1. All samples containing 8 or more phr. of the flame retardant were self-extinguishing and non-dripping within the meaning of the Underwriters' Laboratories Bulletin No. 94. Heat distortion temperatures were measured for each series of samples with results as set forth in the drawing where curve A represents samples containing only the triphenyl phosphate and curve B represents those samples containing the flame retardant combination of the triphenyl phosphate and the Aroclor 1268. It can be seen that those samples containing the triphenyl phosphate exhibit a substantial reduction in heat distortion temperature whereas the samples containing the flame retardant combination of the triphenyl phosphate and the Aroclor 1268 show an initial rapid reduction in heat distortion temperature, but a leveling of a temperature above 200° F. Also, at about 14 phr. flame retardant, a desirable concentration of flame retardant, curve A shows a heat distortion temperature well below the boiling point of water and curve B shows a heat distortion temperature of about 220° F. The formulations of curves A and B exhibit substantially similar flame retardant properties.

EXAMPLES 5–6

The procedure of Example 3 was repeated to provide a first series of samples containing 3 phr. triphenyl phosphate and 9 phr. Aroclor 1268 and a second series of samples containing 3.5 phr. triphenyl phosphate and 7.0 Aroclor 1268. Test bars were formed from each series of samples and used to determine flammability behavior, heat distortion temperature, Izod notched impact strength and tensile properties (from 2½″ L-type tensile bars) with results as set forth in the following table:

| Property | Example 5 | Example 6 |
|---|---|---|
| Self extinguishing time [1]: | | |
| After 1st ignition | 5.8 | 2.3 |
| After 2nd ignition | 5.1 | 7.3 |
| Heat deflection temp. (264 p.s.i.-° F.) | 236 | 236 |
| Impact strength (ft./lbs./inch notch) | 1.16 | 2.24 |
| Yield strength (p.s.i.) | 10,710 | 10,670 |
| Ultimate strength (p.s.i) | 8,260 | 9,490 |
| Elongation (percent) | 17.1 | 93.4 |

[1] Average of 10 samples, no one bar burning over 25 seconds.

EXAMPLE 7

The procedures of Examples 5 and 6 were repeated with the addition of 1.5% polyethylene to the polymer blend with substantially equivalent results.

EXAMPLES 8–12

The procedure of Example 6 may be repeated with the substitution of the following phosphates for triphenyl phosphate with substantially similar results.

diphenyl hydrogen phosphate
diphenyl methyl phosphate
diethylphenyl phosphate
2,6-dimethylphenyldiethyl phosphate
diphenylbutyl phosphate

EXAMPLE 13

A blend comprising 50 parts by weight of a poly(2,6-dimethyl-1,4-phenplene)ether and 50 parts by weight of a high impact polystyrene was mixed with a flame retardant combination comprising 4 phr. triphenyl phosphate and 4 phr. decachlorodiphenyl carbonate in a Waring Blendor. The blended mixture was extruded using a 1" laboratory extruder to produce about two pounds of pellets. The extruded pellets were molded into test bars by means of a molding machine. The test bars measuring 2½" x ½" x ⅛" were used to determine flammability behavior, heat distortion temperature and Izod notched impact strength. Additional 2½" L-type tensile bars were used to determine tensile properties. The results of the various tests are set forth in the following table:

EXAMPLE 14

The procedure of Example 13 was repeated with the substitution of 4,4′-dibromobiphenyl for decachlorodiphenylcarbonate with results as set forth in the following table:

Property:
- Self extinguishing time [1]—
    - After 1st ignition _____ 2.1
    - After 2nd ignition _____ 2.2
- Heat deflection temp. (264 p.s.i.-° F.) _____ 220
- Impact strength (ft./lbs./inch notch) _____ 1.28
- Yield strength (p.s.i.) _____ 9,940
- Ultimate strength (p.s.i.) _____ 8,350
- Elongation (percent) _____ 49.7

[1] Average of 10 samples, no one bar burning over 25 seconds.

EXAMPLE 15

The procedure of Example 13 was repeated with the substitution of brominated Dowtherm, a brominated mixture of biphenyl and diphenyl ether (Dowtherm [unbrominated] is available from the Dow Chemical Company) for the decachlorodiphenylcarbonate with results as set forth in the following table:

Property:
- Self extinguishing time [1]—
    - After 1st ignition _____ 2.0
    - After 2nd ignition _____ 3.8
- Heat deflection temp. (264 p.s.i.-° F.) _____ 241
- Impact strength (ft./lbs./inch notch) _____ 1.40
- Yield strength (p.s.i.) _____ 11,330
- Ultimate strength (p.s.i.) _____ 9,360
- Elongation (percent) _____ 45.4

[1] Average of 10 samples, no one bar burning over 25 seconds.

It should be understood that various changes and modifications may be made in the embodiments described herein without departing from the scope of the invention as defined by the following claims. For example, a chlorinated or brominated polystyrene may be used in conjunction with the flame retardant combination to further improve flame retardant properties. In addition, the blends of this invention are typically admixed with other additives such as pigments, plasticizers and the like. Furthermore, third component resins may be added to the blends such as polyethylene in small concentrations without departing from the scope of the invention.

I claim:

1. In a polymer blend consisting essentially of a polyphenylene ether of the formula:

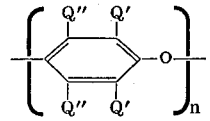

wherein the oxygen ether atom of one unit is connected to the benzene nucleus of the next adjoining unit; $n$ is a positive integer equal to at least 100; and each $Q'$ and $Q''$ is a monovalent substituent selected from the group consisting of hydrogen, halogen, hydrocarbon radicals free of a tertiary alpha-carbon atom, halohydrocarbon radicals having at least two carbon atoms between the halogen atom and phenol nucleus and being free of a tertiary alpha-carbon atom, hydrocarbonoxy radicals being free of a tertiary alpha-carbon atom, and halohydrocarbonoxy radicals having at least two carbon atoms between the halogen atom and the phenyl nucleus and being free of a tertiary alpha-carbon atom and a styrene resin, the improvement comprising the addition of a flame retardant combination of (a) an aromatic phosphate compound of the formula

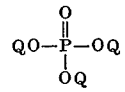

where at least one of the Q groups is phenyl and the remaining Q groups are individually selected from the group of hydrogen and hydrocarbon radicals and (b) an aromatic halogen compound of the formula

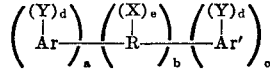

wherein R is an alkylene, alkylidene or cycloaliphatic linkage; or a linkage selected from ether, carbonyl or amine; a sulfur- or phosphorus-containing linkage; or two or more alkylene or alkylidene linkages joined by aromatic, amino, ether, carbonyl, sulfide, sulfoxide, sulfone or phosphorus-containing linkage;

Ar and Ar′ are mono- or poly-carbocyclic aromatic groups;

Y is halogen, an ether group, monovalent hydrocarbon, nitro or cyano, there being at least 2 halogen atoms per aryl nucleus;

X is a monovalent hydrocarbon group;

$d$ is a whole number ranging from 1 to the maximum number of replaceable hydrogens substituted on Ar or Ar′;

$e$ is 0 or a whole number ranging from 1 to the maximum number of replaceable hydrogens on R; and $a$, $b$, and $c$ are 0 or whole numbers, provided that when $b$ is a whole number, neither $a$ nor $c$ is 0, and when $b$ is 0, either $a$ or $c$, but not both, may be 0, at a ratio of at least least 1:5 aromatic phosphate (a) to aromatic halogen compound (b) in an amount whereby a test bar measuring 2½" x ½" x ⅛" formed from the blend will not drip upon ignition and will extinguish itself within 30 seconds, the heat distortion temperature of said blend being substantially above that of a blend of said polyphenylene ether, said styrene resin and said aromatic phosphate (a) only, with substantially similar flame retardant properties.

2. The blend of claim 1 where the styrene resin is present in an amount of 80 to 20% by weight of the total blend and has at least 25% by weight units derived from the compound having the formula:

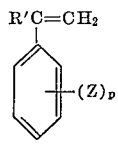

where R' is hydrogen, lower alkyl or halogen; Z is a member selected from the class consisting of vinyl, halogen, and lower alkyl; and $p$ is a whole number equal to from from 0 to the number of replaceable hydrogen atoms on the benzene nucleus.

3. The blend of claim 1 where each Q' is lower alkyl and each Q" is hydrogen.

4. The blend of claim 2 where $p$ is 0 and R' is hydrogen.

5. The blend of claim 3 where the phosphate component of the flame retardant combinations conforms to the formula

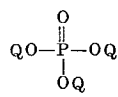

where each Q is individually selected from the group of hydrogen and hydrocarbon radicals provided that at least one Q is phenyl.

6. The blend of claim 5 where the aromatic halogen component is a halogenated benzene having at least two halgen atosms.

7. The blend of claim 6 where the aromatic halogen component is a dichloro-benzene.

8. The blend of claim 5 where the aromatic halogen component is a biphenyl having at least two halogen atoms per phenylene nucleus.

9. The blend of claim 8 where the halogen atoms are chlorine.

10. The blend of claim 8 where the halogen atoms are bromine.

11. The blend of claim 5 where the aromatic halogen component has two phenyl radicals joined by a bivalent radical and each phenyl radical has at least two halogen atoms attached thereto.

12. The blend of claim 11 where the bivalent radical is alkylene and the halogen atoms are chlorine.

13. The blend of claim 11 where the bivalent radical is alkylene and the halogen atoms are bromine.

14. The blend of claim 5 where each Q is phenyl.

15. In a blend consisting essentially of from 20 to 80% of a poly(2,6-dimethyl-1,4-phenylene)ether and from 80 to 20% of a high impact polystyrene, the improvement comprising the addition of a flame retardant combination of (a) an aromatic phosphate compound of the formula

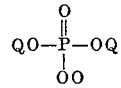

where at least one of said Q's is phenyl and the remaining Q's are individually selected from the group of hydrogen and hydrocarbon radicals, and (b) an aromatic monocarbocyclic or dicarbocyclic compound having at least two halogen atoms per aryl nucleus at a ratio of at least 1:5 aromatic phosphate (a) to aromatic halogen compound (b) in an amount whereby a test bar measuring 2½" x ½" x ⅛" formed from the blend will not drip upon ignition and will extinguish itself within 30 seconds, the heat distortion temperature of said blend being substantially above that of a blend of said poly(2,6-dimethyl-1,4-phenylene)ether, said high impact polystyrene, and said aromatic phosphate compound (a) only, with substantially similar flame retardant properties.

16. The blend of claim 15 where each Q is phenyl.

17. The blend of claim 15 where the aromatic halogen compound is a chlorinated benzene.

18. The blend of claim 15 where the aromatic halogen compound is a chlorinated biphenyl.

19. The blend of claim 15 where the aromatic halogen compound comprises two phenyl radicals separated by a divalent group and has at least two chlorine atoms per phenyl nucleus.

References Cited
UNITED STATES PATENTS

| | | | |
|---|---|---|---|
| 3,383,435 | 5/1968 | Cizek | 260—874 |
| 3,422,047 | 1/1969 | Cannelongo | 260—45.7 |

FOREIGN PATENTS

| | | | |
|---|---|---|---|
| 918,440 | 2/1963 | Great Britain | 260 FP DIG |

SAMUEL H. BLECH, Primary Examiner

U.S. Cl. X.R.

260—45.7 P, 45.95, 876 R, 887, 892, 893, 897 R, 898, 899, DIG 24

UNITED STATES PATENT OFFICE
CERTIFICATE OF CORRECTION

Patent No. U.S. 3,639,506        Dated February 1, 1972

Inventor(s) William R. Haaf

It is certified that error appears in the above-identified patent and that said Letters Patent are hereby corrected as shown below:

In Column 9, line 30, "halgen atosms" should read -- halogen atoms --; Column 10, line 10 the formula should read

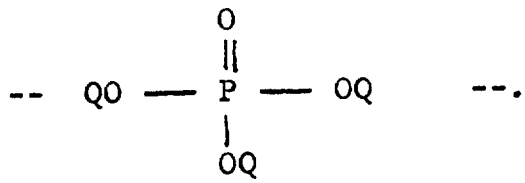

Signed and sealed this 23rd day of January 1973.

(SEAL)
Attest:

EDWARD M. FLETCHER, JR.
Attesting Officer

ROBERT GOTTSCHALK
Commissioner of Patents